(12) United States Patent
Kurose et al.

(10) Patent No.: US 6,361,822 B1
(45) Date of Patent: Mar. 26, 2002

(54) METHOD OF PRODUCING AN ELECTRODE FOR NON-AQUEOUS ELECTROLYTE BATTERY

(75) Inventors: Shigeo Kurose; Tadayoshi Iijima, both of Saku; Tetsuya Takahashi, Nagano, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/423,641

(22) PCT Filed: May 27, 1998

(86) PCT No.: PCT/JP98/02315
§ 371 Date: Nov. 18, 1999
§ 102(e) Date: Nov. 18, 1999

(87) PCT Pub. No.: WO98/54772
PCT Pub. Date: Dec. 3, 1998

(30) Foreign Application Priority Data

May 27, 1997 (JP) .............................. 9-136656
May 27, 1997 (JP) .............................. 9-136668

(51) Int. Cl.[7] .............................. B05D 5/12; H01M 4/40; H01M 4/48; H01M 4/52
(52) U.S. Cl. .................. 427/77; 427/126.3; 427/126.4; 427/126.6; 427/376.2; 429/218.1; 429/223; 429/231.95
(58) Field of Search ................ 427/77, 126.3, 427/126.4, 126.6, 376.2; 429/218.1, 221, 223, 224, 231.95

(56) References Cited

U.S. PATENT DOCUMENTS

| | | | |
|---|---|---|---|
| 5,180,574 A | 1/1993 | Von Sacken | |
| 5,462,820 A | 10/1995 | Tanaka | |
| 5,599,435 A * | 2/1997 | Li et al. | 205/59 |
| 5,620,812 A * | 4/1997 | Tahara et al. | 429/223 |
| 5,698,338 A * | 12/1997 | Barker et al. | 429/223 |
| 5,718,989 A * | 2/1998 | Aoki et al. | 429/218 |
| 5,770,173 A | 6/1998 | Nitta et al. | |
| 5,824,434 A * | 10/1998 | Kawakami et al. | 429/209 |
| 5,955,051 A * | 9/1999 | Li et al. | 423/594 |
| 5,985,488 A * | 11/1999 | Mitate et al. | 429/223 |
| 6,103,420 A * | 8/2000 | Nakane et al. | 429/223 |

FOREIGN PATENT DOCUMENTS

| | | |
|---|---|---|
| EP | 0 624 552 A1 | 11/1994 |
| EP | 0 690 517 A1 | 1/1996 |
| EP | 0 704 921 A1 | 4/1996 |
| EP | 0 730 314 A1 | 9/1996 |

OTHER PUBLICATIONS

Abstract of Japanese Patent Publ. No. 09147835; dated Jun. 6, 1997.
Abstract of Japanese Patent Publ. No. 09115504; dated May 2, 1997.
Abstract of Japanese Patent Publ. No. 09082325; dated Mar. 28, 1997.
Abstract of Japanese Patent Publ. No. 09213330; dated Aug. 15, 1997.

* cited by examiner

Primary Examiner—Michael Barr
(74) Attorney, Agent, or Firm—Rader, Fishman & Grauer, PLLC

(57) ABSTRACT

An active material having a composition of $Li_xNi_yM_zO_2$ ($0.8<x<1.5$, $0.8<y+z<1.2$, $0 \leq z<0.35$; M is an element selected from Co, Mg, Ca, Sr, Al, Mn and Fe) is preserved in a gas having a moisture dew point of $-20°$ C. or less from immediately after production of said active material till preparation of an active material mixture-coating material, or is subjected to vacuum drying immediately before preparation of said active material mixture-coating material. The prepared mixture-coating material is applied onto a collector.

3 Claims, 1 Drawing Sheet

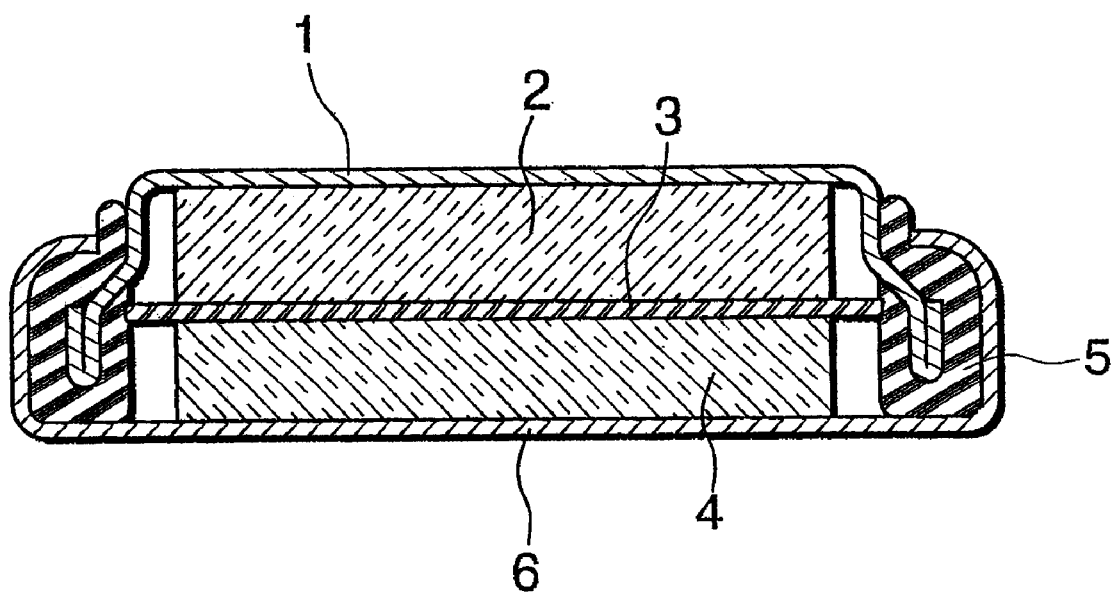

METHOD OF PRODUCING AN ELECTRODE FOR NON-AQUEOUS ELECTROLYTE BATTERY

TECHNICAL FIELD OF THE INVENTION

The present invention relates to a method for producing an electrode for a non-aqueous electrolyte battery, and more particularly, to a method for producing a non-aqueous electrolyte battery electrode which includes an electrode active material layer containing at least an active material having a composition of $Li_xNi_yM_zO_2$ (where x satisfies 0.8<x<1.5, y+z satisfies 0.8<y+z<1.2, z satisfies $0 \leq z<0.35$, and M is at least one element selected from Co, Mg, Ca, Sr, Al, Mn and Fe) and has excellent battery characteristics and preservation properties.

TECHNICAL BACKGROUND OF THE INVENTION

Recent development of devices in the electronic field is remarkable, and various devices such as video cameras, liquid crystal cameras, portable telephones, laptop computers, and word processors are now being developed. In accordance therewith, there are increasing needs for reduction in size and weight and achievement of high energy density in batteries that are to be used as power sources for these electronic devices.

Conventionally, lead batteries or nickel-cadmium batteries have been used for these electronic devices. These conventional batteries cannot sufficiently meet the needs for reduction in size and weight and achievement of high energy density.

Accordingly, there are proposed non-aqueous electrolyte batteries using a non-aqueous electrolytic solution containing a lithium salt dissolved in a non-aqueous solvent. As these non-aqueous electrolyte batteries, batteries in which a metal lithium, a lithium alloy, or a carbon material capable of being doped and undoped with lithium ions is used as a negative electrode material and a lithium cobalt composite oxide is used as a positive electrode material are already in practical use.

Having a high operation voltage of 3 to 4V, the non-aqueous electrolyte batteries of this type can be made to have a high energy density and excellent cycle characteristics with only a small amount of self-discharge.

Also, in order to attain further reduction in size and weight and achievement of high energy density in these non-aqueous electrolyte batteries, eager researches for development of active materials and the like are now being carried out. As positive electrode active materials, Ni-containing lithium composite oxides such as lithium-nickel composite oxides and lithium-nickel-cobalt composite oxides are also proposed.

For example, Japanese Laid-open Patent Publication No. 9-213,330/1997 discloses a method for producing an electrode active material for a non-aqueous electrolyte battery. Namely, the publication discloses a method of calcining a mixture of a lithium compound, a nickel compound, and an N compound (where N is an element other than Li, Ni, or O) in a calcining furnace to obtain a lithium-nickel composite oxide represented by the general formula : $Li_xNi_yN_zO_2$ (0.8<x<1.2, 0.8<y+z<1.2, and $0 \leq z<0.2$), wherein a gas containing 0.01 vol % or less of carbonic acid gas and having a moisture dew point of −20° C. or less is supplied into the calcining furnace at a gas supply rate in which an amount of at least five times the inner volume of the calcining furnace is supplied within one hour.

Thus, although the publication discloses an atmosphere in producing an electrode active material, it fails to provide a disclosure on an environment for preserving the electrode active material or a special treatment before preparation of a mixture-coating material.

DISCLOSURE OF THE INVENTION

Objects of the Invention

The present inventors have made researches on the properties of nickel-containing lithium composite oxides and found that nickel-containing lithium composite oxides tend to absorb moisture in air more than lithium-cobalt composite oxides. Use of an active material in a state with a lot of absorbed moisture in battery causes problems such as decrease in a charge/discharge capacity of the battery, increase in internal resistance, and deterioration of the preservation property.

Accordingly, the purpose of the present invention is to provide a method for producing an electrode for a non-aqueous electrolyte battery which can solve the above-mentioned problems of the prior art as well as giving a large capacity to the battery and controlling the internal resistance of the battery to a low level.

SUMMARY OF THE INVENTION

The present inventors have made an eager research and found out that a nickel-containing lithium composite oxide with low water content can be used for preparation of a mixture-coating material by adjustment of a preservation environment after production of the nickel-containing lithium composite oxide or by a special treatment before the preparation of the mixture-coating material, thus completing the present invention.

Namely, the present invention provides a method for producing an electrode for a non-aqueous electrolyte battery by preparing an electrode active material mixture-coating material containing at least an active material having a composition of $Li_xNi_yM_zO_2$ (where x satisfies 0.8<x<1.5, y+z satisfies 0.8<y+z<1.2, z satisfies $0 \leq z<0.35$, and M is at least one element selected from Co, Mg, Ca, Sr, Al, Mn and Fe) and by applying said active material mixture-coating material onto a collector, said method comprising the step of preserving said active material in a gas having a moisture dew point of −20° C. or less from immediately after production of said active material till preparation of said active material mixture-coating material.

Also, the present invention provides a method for producing an electrode for a non-aqueous electrolyte battery by preparing an electrode active material mixture-coating material containing at least an active material having a composition of $Li_xNi_yM_zO_2$ (where x satisfies 0.8<x<1.5, y+z satisfies 0.8<y+z<1.2, z satisfies $0 \leq z<0.35$, and M is at least one element selected from Co, Mg, Ca, Sr, Al, Mn and Fe) and by applying said active material mixture-coating material onto a collector, said method comprising the step of subjecting said active material to vacuum drying immediately before preparation of said active material mixture-coating material.

Further, the present invention provides a method for producing an electrode for a non-aqueous electrolyte battery by preparing an electrode active material mixture-coating material containing at least an active material having a composition of $Li_xNi_yM_zO_2$ (where x satisfies 0.8<x<1.5, y+z satisfies 0.8<y+z<1.2, z satisfies $0 \leq z<0.35$, and M is at least one element selected from Co, Mg, Ca, Sr, Al, Mn and Fe) and by applying said active material mixture-coating material on a collector, said method comprising the steps of preserving said active material in a gas having a moisture dew point of −20° C. or less from immediately after production of said active material till preparation of said active material mixture-coating material and subjecting said active material to vacuum drying immediately before preparation of said active material mixture-coating material.

In the present invention, said gas having a moisture dew point of −20° C. or less is preferably air, nitrogen gas, or a rare gas.

According to the present invention, an active material having a composition of $Li_xNi_yM_zO_2$ with low water content can be supplied for an electrode. Therefore, use of a non-aqueous electrolyte battery electrode produced by the method of the present invention can give a large capacity to a battery and can control the internal resistance of the battery to a low level.

DETAILED DESCRIPTION OF THE INVENTION

The lithium composite oxide to be used in the present invention is represented by the general formula: $Li_xNi_yM_zO_2$ (where x satisfies 0.8<x<1.5, y+z satisfies 0.8<y+z<1.2, z satisfies $0 \leq z < 0.35$, and M is at least one element selected from Co, Mg, Ca, Sr, Al, Mn and Fe).

An example of a method for producing such a lithium composite oxide is, for example, a process in which a basic metal salt and an alkaline water-soluble lithium compound containing respectively an anion that volatilizes at the time of calcination of $LiMetal^{3+}O_2$ (where the Metal contains Ni as a major component and further contains at least one element selected from Co, Mg, Ca, Sr, Al, Mn and Fe) are allowed to react in an aqueous medium to obtain a slurry, which is then dried and calcined.

The basic metal salt is represented by the general formula: $Metal^{2+}(OH)_{2-nk}(A^-)_k \cdot mH_2O$. Here, the $Metal^{2+}$ is an ion containing Ni as a major component and possibly containing at least one element selected from Co, Mg, Ca, Sr, Al, Mn and Fe. $A^{n-}$ represents an anion with n valences (where n=1 to 3) such as a nitrate ion, a chloride ion, a bromide ion, an acetate ion, or a carbonate ion. Further, k satisfies $0.03 \leq k \leq 0.3$; and m satisfies $0 \leq m < 2$.

The basic metal salt represented by the above-mentioned formula can be produced by adding to an aqueous solution of $Metal^{2+}$ an alkali of about 0.7 to 0.95 equivalent, preferably about 0.8 to 0.95 equivalent, relative to the $Metal^{2+}$, and reacting them under a reaction condition of about 80° C. or less, and then maturing the reaction product at a temperature of 40° C. to 70° C. for 0.1 to 10 hours, followed by washing with water to remove the by-products. The alkali to be used in the reaction may be a hydroxide of an alkali metal such as sodium hydroxide, a hydroxide of an alkali earth metal such as calcium hydroxide, an amine, or the like.

A basic metal salt selected from the compounds represented by the above-mentioned formula and one or more lithium compounds selected from lithium hydroxide, lithium carbonate, hydrates thereof, and the like are allowed to react in water at a concentration in the range of 5 to 25 wt % and at a temperature in the range from room temperature to 100° C. to obtain a slurry, which is then subjected to spray drying for improvement of uniformity in the shape of the composition to be obtained.

The lithium composite oxide can be obtained by subjecting the dried product to a thermal treatment for calcination in an oxidizing gas atmosphere containing air, oxygen, ozone, or the like in a temperature range of about 700 to 1000° C. for about 0.1 to 20 hours.

Another example of a method for producing a lithium composite oxide to be used in the present invention is a process that uses a water-soluble lithium compound and a basic metal carbonate obtained from a water-soluble metal compound.

The water-soluble metal compound to be used in this process is a nitrate, a sulfate, a metal chloride, or the like.

This water-soluble metal compound may contain a nickel compound as a major component and may be mixed with a given amount of another water-soluble metal compound so that at least one element selected from Co, Mg, Ca, Sr, Al, Mn and Fe may be blended therewith.

The basic metal carbonate may be obtained by filtrating and drying a precipitate obtained by allowing a mixture of the above-mentioned water-soluble metal compounds to react with a compound selected from the group consisting of an alkali carbonate, an alkali bicarbonate, ammonium carbonate and ammonium bicarbonate in water, or a precipitate obtained by allowing sodium hydroxide to be present for reaction in the above-mentioned reaction system. In this case, in order to produce a good precipitate, it is preferable to use a little excessive amount of the carbonate, and also it is important to control the stirring condition so as to control the specific surface area of the precipitate.

To the basic metal carbonate thus obtained, a powder of a water-soluble lithium compound such as lithium carbonate or lithium hydroxide is added at a desired ratio of the metal to Li. The resultant mixture in a powder state is first heated to 300 to 500° C. in the presence of an inert gas or an oxygen-containing gas. This heating allows only the decomposition of the basic metal carbonate to proceed, whereby carbonic acid gas in the crystal structure is released. This heating is continued until the generation of the carbonic acid gas substantially stops so as to convert all of the basic metal carbonate into a metal oxide having numerous fine pores.

After the generation of carbonic acid gas substantially stops, the temperature is further raised to allow the molten water-soluble lithium compound to penetrate into the fine pores of the metal oxide, whereby the two compounds will be in an extremely close contact. At this moment, the resultant product is calcined at a temperature of 700 to 900° C. in the presence of oxygen gas or an air rich in oxygen, whereby Ni is turned from bivalent to trivalent to produce a Li composite oxide.

Here, the larger the specific surface area of the basic metal carbonate to be used is (for example, more than 100 m²/g), the more preferable it is, because gas discharge and generation of fine pores after preliminary calcination will be more efficiently performed.

Active materials having such a composition ($Li_xNi_yM_zO_2$) are liable to absorb moisture when they are left alone in air and will be in a state with a lot of absorbed moisture after passing through a crushing step and the like. In the present invention, the active material is preserved in a gas having a moisture dew point of −20° C. or less from immediately after the production of the active material till the preparation of the active material mixture. It is sufficient that the preservation is carried out at an ordinary temperature. This preservation can eliminate the effects produced by moisture. If the moisture dew point of the preserving gas is higher than −20° C., the effects produced by moisture cannot be completely eliminated, so that such problems as decrease in capacity arise. The moisture dew point of the gas is preferably −30° C. or less. The gas is preferably air, nitrogen gas, or a rare gas. Among these gases, nitrogen gas or a rare gas is more preferable.

In the present invention, the active material can be supplied in a state of low water content for the positive electrode by subjecting the active material to vacuum drying immediately before the preparation of the active material mixture-coating material. The degree of vacuum in performing the vacuum drying is, for example, less than 1 Torr, preferably less than 0.1 Torr. The temperature for drying is preferably 100 to 400° C., more preferably 150 to 350° C. The period of time for vacuum drying is preferably 1 to 48 hours.

Further in the present invention, the active material may be preserved in a gas having a moisture dew point of −20° C. or less from immediately after the production of the active material till the preparation of the active material mixture-coating material, and the active material is then subjected to vacuum drying immediately before the preparation of the active material mixture-coating material. In this case, the active material can be supplied in a state of further lower water content for the positive electrode.

By taking these measures, it is possible to avoid decrease in the battery capacity, increase in the internal resistance, and deterioration the preservation properties that are caused by a high water content in the positive electrode active material, thereby realizing a battery having a high energy density.

In the present invention, at least the above-mentioned active material, an electrically conductive agent, and a binder are made into a slurry in an organic solvent to prepare an electrode active material mixture-coating material.

The electrically conductive agent to be used in the present invention is not specifically limited and may be any electron-conducting material that does not undergo a chemical change. Examples of the electrically conductive agent typically include graphites such as natural graphite (vein graphite, flake graphite and others) and artificial graphite, carbon blacks such as acetylene black, Ketjen black, channel black, furnace black, and thermal black, electrically conductive fibers such as carbon fiber, carbon fiber grown in gaseous phase, and metal fiber, and metal powders such as copper, nickel, aluminum, and silver. Among these, flake graphite is preferable.

Specifically, the electrically conductive agent may be one of the LF series manufactured by Chuetsu Graphite Works Co., Ltd., the UFG series manufactured by Showa Denko Co., Ltd., the KS series manufactured by LONZA Co., Ltd., MICROCARBO-G series manufactured by Kansai Netsukagaku Co., Ltd., Ecoscarbons manufactured by Ecos Giken Co., Ltd., and others.

The amount of the electrically conductive agent to be blended is preferably 1 to 15 wt %, more preferably 2 to 10 wt %, in a dried coating film, although it depends on the specific surface area of the active material and the like.

The binder to be used in the present invention is preferably a fluorine rubber or polyvinylidene fluoride (PVDF). Examples of the fluorine rubbers to be used in the present invention include vinylidene fluoride-hexafluoropropylene (VDF-HFP) type copolymers, vinylidene fluoride-hexafluoropropylene-tetrafluoroethylene (VDF-HFP-TFE) type copolymers, vinylidene fluoride-pentafluoropropylene (VDF-PFP) type copolymers, vinylidene fluoride-pentafluoropropylene-tetrafluoroethylene (VDF-PFP-TFE) type copolymers, vinylidene fluoride-perfluoromethyl vinyl ether-tetrafluoroethylene (VDF-PFMVE-TFE) type copolymers, ethylene-tetrafluoroethylene type copolymers, and propylene-tetrafluoroethylene type copolymers. A fluorine-containing polymer with its hydrogen in the main chain substituted by an alkyl group(s) may be used as well.

The amount of the binder to be added is preferably 1 to 20 wt %, more preferably 2 to 15 wt %, although it depends on the specific surface areas and the particle size distributions of the active material and the electrically conductive agent, the strength of the intended electrode, and the like.

The organic solvent to be used for the preparation of the active material mixture-coating material is not specifically limited and may be, for example, cyclohexanone, N-methyl-2-pyrrolidone, methyl ethyl ketone, methyl isobutyl ketone, toluene, acetone, methanol, ethanol, 1-propanol, 2-propanol, or the like. One kind of solvent may be used alone, or alternatively a plural kinds of solvents may be used as a mixture.

In the present invention, the active material, the electrically conductive agent, the binder, and the organic solvent can be mixed and made into a slurry by an ordinary known method. For example, they are mixed in a dry air or in an inert gas by the roll mill method.

The prepared mixture-coating material is applied onto a collector and dried. The collector is not specifically limited and may be any electron-conducting substance that does not undergo a chemical change when it is formed into a battery. For example, the collector may be formed of aluminum, an aluminum alloy, nickel, stainless steel, titanium, or the like. Besides these metals, aluminum or stainless steel whose surface is treated with carbon, nickel, or titanium may be used as well. Especially, aluminum or an aluminum alloy is preferable. The collector may have a foil-like, film-like, net-like, porous, foamed, or the like shape. The thickness of the collector is 1 to 100 μm, preferably 1 to 50 μm.

The electrode active material mixture-coating material is applied onto the collector by an ordinary well-known coating method such as the reverse roll method, direct roll method, blade method, knife method, extrusion nozzle method, curtain method, gravure roll method, bar coat method, dip method, kiss coat method, squeeze method, and the like. Among these, it is preferable to adopt the extrusion nozzle method, whereby a good surface state of the coating layer can be obtained by suitably selecting the solvent composition of the mixture and the drying condition so that the coating material is applied onto the collector at a coating speed of 5 to 100 m/min.

The drying temperature is preferably 30 to 150° C., more preferably 50 to 140° C. If the drying temperature is less than 30° C., the solvent will not be sufficiently dried. On the other hand, if the drying temperature exceeds 150° C., the binder may not be distributed uniformly on the surface of the electrode because the evaporation speed of the solvent is too high, thereby leading to deterioration in the electrode properties.

Here, the thickness, length, and width of the coating layer is determined by the final size of the battery to be obtained. The thickness of the coating layer is preferably adjusted by the ordinarily-adopted calendar processing after the coating step. The processing pressure is preferably 0.2 to 10 t/cm, and the processing temperature is preferably 10 to 150° C.

BRIEF DESCRIPTION OF THE DRAWING

The figure is a cross-sectional view illustrating a coin-type battery used in examples of the present invention for measurement of battery characteristics.

MODE FOR CARRYING OUT THE INVENTION

Hereafter, the present invention will be more specifically explained by way of examples shown below. However, the present invention is not limited by these Examples.

EXAMPLE 1

Nickel nitrate and cobalt nitrate were mixed in an aqueous solution in a ratio of Ni/Co (molar ratio)=0.8/0.2 to form a precipitate, which was dried by a spray dryer to yield approximately spherical particles. These particles and lithium hydroxide were mixed in a ratio of Li/Ni/Co (molar ratio)=1/0.8/0.2, and the resultant mixture was calcined. The obtained particles were immediately preserved in an air having a moisture dew point of −50° C. at an ordinary temperature for a week.

This lithium composite oxide $LiNi_{0.8}CO_{0.2}O_2$ was used as an active material to prepare an electrode mixture-coating material having the following composition of blending. (Composition of blending)

| | |
|---|---|
| Positive electrode active material: the above Li composite oxide | 93 parts by weight |
| Electrically conductive agent: flake graphite (KS 25 manufactured by LONZA Co., Ltd., with an average particle diameter of 11 μm) | 4 parts by weight |
| Binder: polyvinylidene fluoride (PVDF) (KYNAR741 manufactured by ELF-ATOCHEM Japan) | 3 parts by weight |
| Solvent: N-methyl-2-pyrrolidone (NMP) | 67 parts by weight |

PVDF (3 parts by weight) was dissolved in NMP (54 parts by weight) to prepare a binder solution (57 parts by weight). The active material (93 parts by weight) and the electrically conductive agent (4 parts by weight) were mixed in dry process by a hypermixer; and the mixture was introduced into a pressure kneader. The above-mentioned binder solution (13 parts by weight) was added to the mixture and the resultant was kneaded for 30 minutes while cooling the jacket of the pressure kneader with water. The kneaded product was taken out, and the binder solution (44 parts by weight) and NMP (13 parts by weight) were added to dissolve the product in the hypermixer to give an active material mixture-coating material.

The prepared mixture-coating material was applied onto one surface of a collector of aluminum foil of 20 μm thickness by an extrusion nozzle and dried. Then, the mixture-coating material was applied to the other surface of the collector in a similar manner and dried. The obtained coated collector was press-molded by a roller press machine and cut into a given size. Thereafter, the mixture coating film on one side of the collector was peeled off to obtain an electrode of Example 1 with a mixture layer of 65 μm thickness.

EXAMPLE 2

Nickel nitrate and cobalt nitrate were mixed in an aqueous solution in a ratio of Ni/Co (molar ratio)=0.8/0.2 to form a precipitate, which was dried by a spray dryer to yield approximately spherical particles. These particles and lithium hydroxide were mixed in a ratio of Li/Ni/Co (molar ratio)=1/0.8/0.2, and the resultant mixture was calcined. The obtained particles were left to stand in air for 24 hours and then subjected to vacuum drying in an environment of 0.01 Torr and 200° C. by a vacuum dryer for 24 hours.

This lithium composite oxide was used as an active material to prepare an electrode mixture-coating material in the same manner as in Example 1 to produce an electrode of Example 2.

EXAMPLE 3

Nickel nitrate and cobalt nitrate were mixed in an aqueous solution in a ratio of Ni/Co (molar ratio)=0.8/0.2 to form a precipitate, which was dried by a spray dryer to yield approximately spherical particles. These particles and lithium hydroxide were mixed in a ratio of Li/Ni/Co (molar ratio)=1/0.8/0.2, and the resultant mixture was calcined. The obtained particles were immediately preserved in an air having a moisture dew point of −50° C. at an ordinary temperature for a week and then subjected to vacuum drying in an environment of 0.01 Torr and 200° C. by a vacuum dryer for 24 hours.

This lithium composite oxide was used as an active material to prepare an electrode mixture-coating material in the same manner as in Example 1 to produce an electrode of Example 3.

EXAMPLE 4

Nickel nitrate and cobalt nitrate were mixed in an aqueous solution in a ratio of Ni/Co (molar ratio)=0.8/0.2 to form a precipitate, which was dried by a spray dryer to yield approximately spherical particles. These particles and lithium hydroxide were mixed in a ratio of Li/Ni/Co (molar ratio)=1/0.8/0.2, and the resultant mixture was calcined. The obtained particles were immediately preserved in a nitrogen gas having a moisture dew point of −50t at an ordinary temperature for a week and then subjected to vacuum drying in an environment of 0.01 Torr and 200° C. by a vacuum dryer for 24 hours.

This lithium composite oxide was used as an active material to prepare an electrode mixture-coating material in the same manner as in Example 1 to produce an electrode of Example 4.

COMPARATIVE EXAMPLE 1

A nickel lithium composite oxide synthesized in the same manner as Example 1 was left to stand in air for a week until it was used for preparation of an electrode mixture-coating material.

This lithium composite oxide, without any treatment, was used as an active material to prepare the electrode mixture-coating material in the same manner as in Example 1 to produce an electrode of Comparative Example 1.

(Battery Characteristics)

The battery characteristics of each of the electrodes obtained in the Examples 1 to 4 and the Comparative Example 1 were measured in the following manner.

Each of the obtained electrodes was dried for removal of residual moisture in the positive electrode active material layer to fabricate a circular positive electrode having a diameter of 15.5 mm. Separately, metal lithium having a thickness of 1.85 mm was cut into a circular shape with a diameter of 15.5 mm as a negative electrode. Further, a non-aqueous electrolyte solution was prepared by dissolving $LiPF_6$ at a concentration of 1 mol/liter in a mixture solvent containing ethylene carbonate and dimethyl carbonate at a ratio of 1:1 (volume ratio).

A coin-type battery having a diameter of 20 mm×thickness of 2.5 mm was prepared, as shown in the figure, by using the non-aqueous electrolyte solution, the positive electrode, the negative electrode, a thin film separator made of polypropylene, a negative electrode cup, a positive electrode can, and a gasket. In the coin-type battery of the figure, the positive electrode (4) housed in the positive electrode can (6) and the negative electrode (2) housed in the negative electrode cup (1) are laminated through the intermediary of the separator (3); and the positive electrode can (6) and the negative electrode cup (1) are caulked and sealed through the intermediary of the gasket (5). In the figure, the collector is not shown.

The batteries thus fabricated were charged under a condition with a charge voltage of 4.2 V, a charge current of 1 mA, and a charge time of 20 hours, and then discharged under a condition with a discharge current of 1 mA and an final voltage of 3.0 V to determine their charge/discharge capacities. The results are shown in Table 1.

TABLE 1

|  | Charge Capacity (mAh/g) | Discharge Capacity (mAh/g) | Fifth Discharge Capacity (mAh/g) |
| --- | --- | --- | --- |
| EXAMPLE 1 | 214 | 187 | 185 |
| EXAMPLE 2 | 217 | 188 | 187 |
| EXAMPLE 3 | 220 | 193 | 192 |
| EXAMPLE 4 | 215 | 189 | 188 |
| COMPARATIVE EXAMPLE 1 | 180 | 160 | 145 |

From Table 1, it will be understood that the battery with electrodes of the Examples 1 to 4 each have a large charge/discharge capacity, show a large discharge capacity at the fifth discharge time, and are excellent in cycle characteristics. On the other hand, the battery of the Comparative Example 1 has a small charge/discharge capacity and shows a small discharge capacity particularly at the fifth discharge time.

The present invention can be carried out in any other embodiments without departure to the spirit and major characteristics of the present invention. Accordingly, the above examples are described merely for illustrative purposes and these should not be construed as restrictive. Further, any modification within the equivalent to the claims is intended to fall under the scope of the present invention.

INDUSTRIAL APPLICABILITY

As shown and described above, according to the present invention, an active material having a composition of $Li_xNi_yM_zO_2$ with low water content can be supplied for an electrode. Therefore, use of a non-aqueous electrolyte battery electrode produced by the method of the present invention can give a large capacity to a battery and can control the internal resistance of the battery to a low level. Thus, the present invention contributes to improvement in battery characteristics and preservation properties of non-aqueous electrolyte battery.

What is claimed is:

1. A method for producing an electrode for a non-aqueous electrolyte battery by preparing an electrode active material mixture-coating material containing at least an active material having a composition of $Li_xNi_yM_zO_2$ (where x satisfies $0.8<x<1.5$, y+z satisfies $0.8<y+z<1.2$, z satisfies $0 \leq z<0.35$, and M is at least one element selected from the group consisting of Co, Mg, Ca, Sr, Al, Mn and Fe) and by applying said active material mixture-coating material onto a collector, said method comprising the step of preserving said active material in a gas having a moisture dew point of $-20°$ C. or less from immediately after production of said active material till preparation of said active material mixture-coating material.

2. A method for producing an electride for a non-aqueous electrolyte battery by preparing an electrode active material mixture-coating material containing at least an active material having a composition of $Li_xNi_yM_zO_2$ (where x satisfies $0.8<x<1.5$, y+z satisfies $0.8<y+z<1.2$, z satisfies $0 \leq z<0.35$, and M is at least one element selected from the group consisting of Co, Mg, Ca, Sr, Al, Mn and Fe) and by applying said active material mixture-coating material onto a collector, said method comprising the steps of preserving said active material in a gas having a moisture dew point of $-20°$ C. or less from immediately after production of said active material till preparation of said active material mixture-coating material, and subjecting said active material to vacuum drying before preparation of said active material mixture-coating material.

3. A method for producing an electrode for a non-aqueous electrolyte battery according to any one of claims 1 or 2, wherein said gas having a moisture dew point of $-20°$ C. or less is air, nitrogen gas, or a rare gas.

* * * * *